US011180650B2

(12) United States Patent
Lee et al.

(10) Patent No.: US 11,180,650 B2
(45) Date of Patent: Nov. 23, 2021

(54) THERMOPLASTIC RESIN COMPOSITION AND MOLDED PRODUCT MANUFACTURED THEREFROM

(71) Applicant: LOTTE ADVANCED MATERIALS CO., LTD., Yeosu-si (KR)

(72) Inventors: Ki Rim Lee, Uiwang-si (KR); Young Chul Kwon, Uiwang-si (KR); Dong Hui Chu, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 16/637,313

(22) PCT Filed: May 29, 2018

(86) PCT No.: PCT/KR2018/006094
§ 371 (c)(1),
(2) Date: Feb. 7, 2020

(87) PCT Pub. No.: WO2019/031694
PCT Pub. Date: Feb. 14, 2019

(65) Prior Publication Data
US 2020/0231799 A1 Jul. 23, 2020

(30) Foreign Application Priority Data

Aug. 8, 2017 (KR) .................. 10-2017-0100257

(51) Int. Cl.
C08L 51/04 (2006.01)
C08K 3/22 (2006.01)
(52) U.S. Cl.
CPC ........... C08L 51/04 (2013.01); C08L 2205/03 (2013.01); C08L 2207/04 (2013.01)
(58) Field of Classification Search
None
See application file for complete search history.

(56) References Cited

U.S. PATENT DOCUMENTS

| 8,128,998 | B2* | 3/2012 | Li | C09D 175/06 |
| | | | | 427/407.1 |
| 9,228,046 | B2 | 1/2016 | Hong et al. | |
| 10,472,490 | B2* | 11/2019 | Yang | C08K 3/22 |
| 2010/0264383 | A1* | 10/2010 | Tooley | C08K 3/22 |
| | | | | 252/589 |
| 2011/0159259 | A1* | 6/2011 | Park | B29C 48/08 |
| | | | | 428/213 |
| 2014/0242403 | A1* | 8/2014 | Olsen | C09D 5/1687 |
| | | | | 428/497 |

FOREIGN PATENT DOCUMENTS

| JP | 09-212736 | * | 7/1997 |
| JP | 11-035787 A | | 2/1999 |
| JP | 2000-044408 A | | 2/2000 |
| KR | 10-2001-0046875 A | | 6/2001 |
| KR | 10-2009-0073978 A | | 7/2009 |
| KR | 10-1276454 B1 | | 6/2013 |
| KR | 10-2015-0072114 A | | 6/2015 |
| WO | 2019/031694 A1 | | 2/2019 |

OTHER PUBLICATIONS

International Search Report in counterpart International Application No. PCT/KR2018/006094 dated Sep. 7, 2018, pp. 1-4.

* cited by examiner

Primary Examiner — Tae H Yoon
(74) Attorney, Agent, or Firm — Additon, Pendleton & Witherspoon, P.A.

(57) ABSTRACT

A thermoplastic resin composition of the present invention comprises: a base resin comprising a rubber modified vinyl-based graft copolymer, a large-diameter rubbery polymer having an average particle size of approximately 3,000-8,000 nm, and an aromatic vinyl-based copolymer resin; and zinc oxide having an average particle size of approximately 0.5-3 μm and a specific surface area BET of approximately 1-10 m$^2$/g. The thermoplastic resin composition has an excellent low gloss property, antibacterial property and the like.

10 Claims, No Drawings

THERMOPLASTIC RESIN COMPOSITION AND MOLDED PRODUCT MANUFACTURED THEREFROM

CROSS-REFERENCE TO RELATED APPLICATIONS

This application claims priority to and the benefit of International Application No. PCT/KR2018/006094, filed May 29, 2018, which published as WO 2019/031694 on Feb. 14, 2019, and Korean Patent Application No. 10-2017-0100257, filed in the Korean Intellectual Property Office on Aug. 8, 2017, the entire disclosure of each of which is incorporated herein by reference.

TECHNICAL FIELD

The present invention relates to a thermoplastic resin composition and a molded product manufactured using the same. More particularly, the present invention relates to a thermoplastic resin composition having good low-gloss properties and antibacterial properties, and a molded product manufactured using the same.

BACKGROUND ART

Thermoplastic resins are useful as materials for housings of electrical/electronic products, interior/exterior materials for automobiles, and exterior materials for construction due to lower specific gravity than glass or metal and good properties in terms of moldability and impact resistance.

In addition, there is increasing demand for unpainted materials which can provide desired appearance and surface characteristics, such as color, gloss, and the like, without any additional process in order to achieve eco-friendliness and reduction in process costs. Particularly, in the fields of interior/exterior materials for electrical/electronic products or automobiles and exterior materials for construction, there is a need for low gloss products which can meet consumer demand for luxurious appearance.

In order to reduce surface gloss of a molded product (interior/exterior materials and the like) manufactured using a thermoplastic resin composition without any subsequent painting process, there has been proposed a method of increasing the size of rubber in the thermoplastic resin composition to several micrometers or more, or incorporating a highly crosslinked matting agent and/or an inorganic matting agent such as talc into the thermoplastic resin composition. However, the latter has a problem in that, when an excess of matting agents is used, there is a concern of deterioration in appearance due to the matting agents protruding from the surface of the thermoplastic resin composition.

In addition, home appliances manufactured using such a thermoplastic resin composition can suffer from various scratches and adhesion of foreign matter to the surface thereof over time, causing growth of various bacteria.

Therefore, there is a need for a thermoplastic resin composition which has good low-gloss properties and antibacterial properties without deterioration in appearance.

The background technique of the present invention is disclosed in Korean Patent No. 10-1276454 and the like.

DISCLOSURE

Technical Problem

It is one aspect of the present invention to provide a thermoplastic resin composition which has good low-gloss properties and antibacterial properties.

It is another aspect of the present invention to provide a molded product formed of the thermoplastic resin composition set forth above.

The above and other aspects of the present invention will become apparent from the detailed description of the following embodiments.

Technical Solution

One aspect of the present invention relates to a thermoplastic resin composition. The thermoplastic resin composition includes: a base resin including a rubber-modified vinyl graft copolymer, a large-diameter rubber polymer having an average particle diameter of about 3,000 nm to about 8,000 nm, and an aromatic vinyl copolymer resin; and zinc oxide having an average particle diameter of about 0.5 µm to about 3 µm and a BET specific surface area of about 1 $m^2/g$ to about 10 $m^2/g$.

In one embodiment, the thermoplastic resin composition may include: about 100 parts by weight of the base resin including about 10 to about 50 wt % of the rubber-modified vinyl graft copolymer, about 0.5 wt % to about 15 wt % of the large-diameter rubber polymer, and about 40 to about 85 wt % of the aromatic vinyl copolymer resin; and about 0.1 parts by weight to about 10 parts by weight of the zinc oxide.

In one embodiment, the rubber-modified vinyl graft copolymer may be obtained by graft-polymerization of a monomer mixture including an aromatic vinyl monomer and a vinyl cyanide monomer to a rubber polymer having an average particle diameter of about 100 nm to about 600 nm.

In one embodiment, the large-diameter rubber polymer may be present in the thermoplastic resin composition in the form of a rubber-modified aromatic vinyl copolymer resin prepared by continuous solution polymerization of a rubber polymer having a viscosity of about 150 cP or more in a 5 wt % styrene solution, an aromatic vinyl monomer, and a monomer copolymerizable with the aromatic vinyl monomer.

In one embodiment, the aromatic vinyl copolymer resin may be a polymer of an aromatic vinyl monomer and a monomer copolymerizable with the aromatic vinyl monomer.

In one embodiment, the thermoplastic resin composition may have a structure in which the rubber-modified vinyl graft copolymer, the large-diameter rubber polymer, and the zinc oxide are present as a dispersed phase in the aromatic vinyl copolymer resin as a continuous phase.

In one embodiment, the zinc oxide may have a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement.

In one embodiment, the zinc oxide may have a peak position degree (2θ) in the range of 35° to 37° and a crystallite size of about 1,000 Å to about 2,000 Å in X-ray diffraction (XRD) analysis, as calculated by Equation 1:

$$\text{Crystallite size } (D) = \frac{K\lambda}{\beta\cos\theta} \quad \text{[Equation 1]}$$

where K is a shape factor, λ is an X-ray wavelength, β is an FWHM value (degree) of an X-ray diffraction peak, and θ is a peak position degree.

In one embodiment, the thermoplastic resin composition may have a gloss of about 10% to about 70%, as measured at an angle of 60° in accordance with ASTM D523.

In one embodiment, the thermoplastic resin composition may have an antibacterial activity of about 2.0 to about 7.0 against *Staphylococcus aureus* and an antibacterial activity of about 2.0 to about 7.5 against *Escherichia coli*, as measured on 5 cm×5 cm specimens after inoculation with *Staphylococcus aureus* and *Escherichia coli*, respectively, and culturing under conditions of 35° C. and 90% RH for 24 hours in accordance with JIS Z 2801.

Another aspect of the present invention relates to a molded article. The molded article is formed of the thermoplastic resin composition set forth above.

Advantageous Effects

The present invention provides a thermoplastic resin composition which has good low-gloss properties and antibacterial properties, and a molded product formed of the same.

BEST MODE

Hereinafter, embodiments of the present invention will be described in detail.

A thermoplastic resin composition according to the present invention includes: (A) a base resin including (A1) a rubber-modified vinyl graft copolymer, (A2) a large-diameter rubber polymer, and (A3) an aromatic vinyl copolymer resin; and (B) zinc oxide.

(A) Base Resin

The base resin according to the present invention may include the rubber-modified vinyl graft copolymer (A1), the large-diameter rubber polymer (A2), and the aromatic vinyl copolymer resin (A3).

(A1) Rubber-Modified Aromatic Vinyl Graft Copolymer

The rubber-modified vinyl graft copolymer according to one embodiment of the present invention serves to improve impact resistance and chemical resistance of the thermoplastic resin composition, and may be obtained by graft-polymerization of a monomer mixture including an aromatic vinyl monomer and a vinyl cyanide monomer to a rubber polymer. The monomer mixture may further include a monomer for imparting processability and heat resistance, as needed. Here, the polymerization may be carried out by any suitable polymerization method known in the art, such as emulsion polymerization and suspension polymerization. In addition, the rubber-modified vinyl graft copolymer may have a core (the rubber polymer)-shell (a copolymer of the monomer mixture) structure.

In some embodiments, the rubber polymer may include: diene rubbers (rubber polymers) such as polybutadiene, poly(styrene-butadiene), and poly(acrylonitrile-butadiene); saturated rubbers obtained by adding hydrogen to the diene rubbers; isoprene rubbers; acrylic rubbers (rubber polymers) such as polybutyl acrylate; and ethylene-propylene-diene terpolymer (EPDM), without being limited thereto. These may be used alone or as a mixture thereof. For example, the rubber polymer may be a butadiene rubber, specifically a polybutadiene rubber.

In some embodiments, the rubber polymer (rubber particles) may have an average particle size (D50) of about 100 nm to about 600 nm, for example, about 200 nm to about 400 nm, as measured using a particle size analyzer. Within this range, the thermoplastic resin composition can have good properties in terms of impact resistance and appearance characteristics.

In some embodiments, the rubber polymer may be present in an amount of about 20 wt % to about 70 wt %, for example, about 30 wt % to about 65 wt %, based on the total weight of the rubber-modified vinyl graft copolymer, and the monomer mixture (including the aromatic vinyl monomer and the vinyl cyanide monomer) may be present in an amount of about 30 wt % to about 80 wt %, for example, about 35 wt % to about 70 wt %, based on the total weight of the rubber-modified vinyl graft copolymer. Within this range, the thermoplastic resin composition can have good properties in terms of impact resistance and appearance characteristics.

In some embodiments, the aromatic vinyl monomer is graft-copolymerizable to the rubber polymer, and may include, for example, styrene, α-methylstyrene, β-methyl styrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof. The aromatic vinyl monomer may be present in an amount of about 10 wt % to about 90 wt %, for example, about 40 wt % to about 90 wt %, based on the total weight of the monomer mixture. Within this range, the thermoplastic resin composition can have good properties in terms of processability and impact resistance.

In some embodiments, the vinyl cyanide monomer is copolymerizable with the aromatic vinyl monomer, and may include, for example, acrylonitrile, methacrylonitrile, ethacrylonitrile, phenylacrylonitrile, α-chloroacrylonitrile, and fumaronitrile. These may be used alone or as a mixture thereof. For example, the vinyl cyanide monomer may be acrylonitrile or methacrylonitrile. The vinyl cyanide monomer may be present in an amount of about 10 wt % to about 90 wt %, for example, about 10 wt % to about 60 wt %, based on the total weight of the monomer mixture. Within this range, the thermoplastic resin composition can have good chemical resistance and mechanical properties.

In some embodiments, the monomer for imparting processability and heat resistance may include, for example, (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on the total weight of the monomer mixture. Within this range, the monomer for imparting processability and heat resistance can impart processability and heat resistance to the thermoplastic resin composition without deterioration in other properties.

In some embodiments, the rubber-modified vinyl graft copolymer may include, for example, an acrylonitrile-butadiene-styrene graft copolymer (g-ABS) and an acrylate-styrene-acrylonitrile graft copolymer (g-ASA).

In some embodiments, the rubber-modified vinyl graft copolymer may be present in an amount of about 10 wt % to about 50 wt %, for example, about 20 wt % to about 40 wt %, based on the total weight of the base resin (including the rubber-modified vinyl graft copolymer (A1), the large-diameter rubber polymer (A2), and the aromatic vinyl copolymer resin (A3)). Within this range, the thermoplastic resin composition can have good low-gloss properties, appearance characteristics, impact resistance, and flowability (moldability).

(A2) Large-Diameter Rubber Polymer

The large-diameter rubber polymer according to one embodiment of the present invention may have an average particle diameter (D50, volume average) of about 3,000 nm to about 8,000 nm, for example, about 4,000 nm to about 7,000 nm, as measured using a particle size analyzer, and serves to improve low-gloss properties of the thermoplastic resin composition. If the average particle diameter of the large-diameter rubber polymer is less than about 3,000 nm, there is a concern of deterioration in low-gloss properties of the thermoplastic resin composition. If the average particle diameter of the large-diameter rubber polymer exceeds about 8,000 nm, there is a concern of deterioration in impact resistance of the thermoplastic resin composition.

In some embodiments, the large-diameter rubber polymer may be present in the thermoplastic resin composition in the form of a rubber-modified aromatic vinyl copolymer resin (a mixture of the large-diameter rubber polymer (A2) having an average particle diameter of about 3,000 nm to about 8,000 nm, as a dispersed phase, and a part or all of the aromatic vinyl copolymer resin (A3) as a continuous phase) prepared by continuous solution polymerization of a rubber polymer having a viscosity of about 150 cP or more in a 5 wt % styrene solution, an aromatic vinyl monomer, and a monomer copolymerizable with the aromatic vinyl monomer.

Specifically, the rubber-modified aromatic vinyl copolymer resin may be prepared by mixing a polymerization initiator and a molecular weight regulator with a mixed solution of the rubber polymer, the aromatic vinyl monomer, the monomer copolymerizable with the aromatic vinyl monomer, and a solvent to prepare a reaction solution; introducing the reaction solution into a first reactor, followed by polymerization to a conversion of about 30% to about 40%; and introducing a polymerized product prepared in the first reactor into a second reactor, followed by polymerization to a conversion of about 70% to about 80%.

In some embodiments, the mixed solution may include about 3 wt % to about 15 wt % of the rubber polymer, about 50 wt % to about 85 wt % of the aromatic vinyl monomer and the monomer copolymerizable with the aromatic vinyl monomer, and about 5 wt % to about 30 wt % of the solvent.

In some embodiments, the rubber polymer included in the mixed solution may include, for example, diene rubbers (rubber polymers) such as polybutadiene, poly(styrene-butadiene), and poly(acrylonitrile-butadiene); saturated rubbers obtained by adding hydrogen to the diene rubbers; isoprene rubbers; acrylic rubbers (rubber polymers) such as polybutyl acrylate; and ethylene-propylene-diene terpolymer (EPDM), without being limited thereto. These may be used alone or as a mixture thereof. For example, the rubber polymer may be a butadiene rubber, specifically a polybutadiene rubber. In addition, the rubber polymer may have a viscosity of about 150 cP or more, for example, about 150 cP to about 300 cP, specifically about 160 cP to about 200 cP, in a 5 wt % styrene solution. Within this range of viscosity in styrene solution, the large-diameter rubber polymer can be prepared.

In some embodiments, the aromatic vinyl monomer included in the mixed solution may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof.

In some embodiments, the monomer copolymerizable with the aromatic vinyl monomer, which is included in the mixed solution, may include, for example, vinyl cyanide monomers such as acrylonitrile, methacrylonitrile, ethacrylonitrile, phenylacrylonitrile, α-chloroacrylonitrile, and fumaronitrile. These may be used alone or as a mixture thereof.

In some embodiments, the aromatic vinyl monomer may be present in an amount of about 20 wt % to about 90 wt %, for example, about 30 wt % to about 80 wt %, based on the total weight of the aromatic vinyl monomer and the monomer copolymerizable with the aromatic vinyl monomer, and the monomer copolymerizable with the aromatic vinyl monomer may be present in an amount of about 10 wt % to about 80 wt %, for example, about 20 wt % to about 70 wt %, based on the total weight of the aromatic vinyl monomer and the monomer copolymerizable with the aromatic vinyl monomer.

In some embodiments, the solvent may include an aromatic organic solvent. For example, the solvent may include ethylbenzene, xylene, and toluene. These may be used alone or as a mixture thereof.

In some embodiments, the polymerization initiator preferably has a half-life of 10 minutes or less at a given reactor (polymerization) temperature, and may include, for example, radical initiators such as 1,1-bis(t-butylperoxy)-2-methylcyclohexane, 1,1-bis(t-butylperoxy)cyclohexane, 2-bis(4,4-di-t-butylperoxy cyclohexane)propane, t-hexylperoxy isopropyl monocarbonate, t-butylperoxy maleic acid, t-butylperoxy-3,5,5-trimethylhexanoate, t-butylperoxy laurate, 2,5-dimethyl-2,5-bis(m-toluoylperoxy)hexane, t-butylperoxy isopropyl monocarbonate, t-butylperoxy 2-ethylhexyl monocarbonate, t-hexylperoxy benzoate, 2,5-dimethyl-2,5-bis(benzoylperoxy)hexane, t-butylperoxy acetate, 2,2-bis(t-butylperoxy)butane, t-butylperoxy benzoate, n-butyl-4,4-bis(t-butylperoxy)valerate, and mixtures thereof. The polymerization initiator may be present in an amount of about 0.007 parts by weight to about 0.07 parts by weight, for example, about 0.01 parts by weight to about 0.05 parts by weight, relative to about 100 parts by weight of the mixed solution. Within this range, deterioration in appearance characteristics due to a residue of the polymerization initiator can be reduced.

In some embodiments, the molecular weight regulator may include alkyl mercaptans, such as t-dodecyl mercaptan and n-dodecyl mercaptan. The molecular weight regulator may be present in an amount of about 0.02 parts by weight to about 1 part by weight, for example, about 0.03 parts by weight to about 0.5 parts by weight, relative to about 100 parts by weight of the mixed solution.

In some embodiments, the continuous solution polymerization is preferably performed while circulating a refrigerant through a jacket, a coil, or the like, so as to control exothermic reaction that can occur in the reactors during the polymerization process.

The reaction solution with the polymerization initiator and the molecular weight regulator added thereto may be polymerized to a conversion of about 30% to about 40%, for example, about 32% to about 38%, in the first reactor. Within this range, stable polymerization can be achieved without excessive load of a stirrer.

In some embodiments, a reaction temperature in the first reactor may range from about 60° C. to about 150° C., for example, about 70° C. to about 130° C. Here, the reaction temperature may be varied depending on the type of reactor used, stirring rate, the type of polymerization initiator used, and the like.

In some embodiments, a stirring rate in the first reactor may range from about 60 rpm to about 150 rpm, for example, about 80 rpm to about 120 rpm, specifically about 90 rpm to about 130 rpm. Here, the stirring rate may be varied depending on reactor size, the type of polymerization initiator used, reaction temperature, and the like. Within this range, the large-diameter rubber polymer can be prepared.

In some embodiments, the polymerized product prepared in the first reactor may be polymerized to a conversion of about 70% to about 80% in the second reactor. Within this range, the large-diameter rubber polymer can be produced.

In some embodiments, a reaction temperature in the second reactor may range from about 80° C. to about 170° C., for example, about 120° C. to about 160° C. Here, the reaction temperature may be varied depending on the type of reactor used, stirring rate, the type of polymerization initiator used, and the like.

In some embodiments, a stirring rate in the second reactor may range from about 50 rpm to about 100 rpm, for example, about 60 rpm to about 95 rpm, specifically about 65 rpm to about 90 rpm. Here, the stirring rate may be varied depending on reactor size, the type of polymerization initiator used, reaction temperature, and the like. Within this range, the large-diameter rubber polymer can be prepared.

In some embodiments, the continuous solution polymerization may further include removing unreacted monomers and a residue of the solvent by devolatilizing a polymerized product prepared in the second reactor. Here, the devolatilization process may be performed using a devolatilization tank. In one embodiment, the devolatilization process may be performed using a single devolatilization tank. In another embodiment, the devolatilization process may be performed using a first devolatilization tank and a second devolatilization tank vertically connected to each other to remove a remaining unreacted material. Through the devolatilization process, the content of residual monomers in the polymerized product may be reduced to about 1,500 ppm or less, for example, about 1,000 ppm or less, and specifically about 700 ppm or less.

In some embodiments, the devolatilization tank (devolatilization device) is preferably a fall-stranding-type devolatilization tank (DEVO). Here, the angle of a cone of the fall-stranding type devolatilization tank is set to minimize retention time in the devolatilization tank and to effectively transfer a devolatilized product to an underlying gear pump.

In some embodiments, the first devolatilization tank and the second devolatilization tank may be vertically connected to each other to minimize a connection line between the DEVOs. In addition, it is desirable that the first devolatilization tank DV-1 be provided with a control valve or a regulator to regulate pressure thereof.

In some embodiments, the first devolatilization tank may be operated under conditions of a pressure of about 100 torr to about 600 torr, for example, about 200 torr to about 500 torr, a temperature of about 160° C. to about 240° C., for example, about 180° C. to about 220° C., and a retention time of about 10 minutes or less. Within these ranges, reduction of impurities such as remaining monomers and high productivity can be achieved. In addition, the second devolatilization tank may be operated under conditions of a pressure of about 1 torr to about 50 torr, a temperature of about 210° C. to about 250° C., and a retention time of about 10 minutes or less, for example, 5 minutes or less. Within these ranges, the prepared rubber-modified aromatic vinyl copolymer resin can have good properties in terms of color and the like.

In some embodiments, the aromatic vinyl copolymer resin in the rubber-modified aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can have good properties in terms of mechanical strength and moldability.

Here, the aromatic vinyl copolymer in the rubber-modified aromatic vinyl copolymer resin may have the same composition as the aromatic vinyl copolymer resin (A3), and a separate (second) aromatic vinyl copolymer resin other than the (first) aromatic vinyl copolymer resin of the rubber-modified aromatic vinyl copolymer resin may be added to the base resin to allow the content of the aromatic vinyl copolymer resin (A3) in the thermoplastic resin composition to fall within the range specified herein.

In some embodiments, the large-diameter rubber polymer may be present in an amount of about 0.5 wt % to about 15 wt %, for example, about 1 wt % to about 10 wt %, based on the total weight of the base resin ((A1), (A2), and (A3)). Specifically, the large-diameter rubber polymer may be present in an amount of about 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, or 15 wt %, based on the total weight of the base resin. In addition, the large-diameter rubber polymer may be present in an amount of greater than or equal to one of the above numerical values and less than or equal to one of the above numerical values in the base resin. Within this range, the thermoplastic resin composition can have good low-gloss properties, appearance characteristics, impact resistance, and flowability (moldability).

(A3) Aromatic Vinyl Copolymer Resin

The aromatic vinyl copolymer resin according to one embodiment of the present invention may include an aromatic vinyl copolymer resin used in typical rubber-modified vinyl copolymer resins. For example, the aromatic vinyl copolymer resin may be a polymer of a monomer mixture including an aromatic vinyl monomer and a monomer copolymerizable with the aromatic vinyl monomer, such as a vinyl cyanide monomer. Here, the aromatic vinyl copolymer resin (A3) may include: the aromatic vinyl copolymer resin in the rubber-modified aromatic vinyl copolymer resin (a mixture of the large-diameter rubber polymer having an average particle diameter of about 3,000 nm to about 8,000 nm, as a dispersed phase, and the aromatic vinyl copolymer resin as a continuous phase); and a separate aromatic vinyl copolymer resin, which is added to the base resin to allow the content of the aromatic vinyl copolymer resin (A3) in the thermoplastic resin composition to fall within the range specified herein.

In some embodiments, the separate aromatic vinyl copolymer resin may be prepared by mixing an aromatic vinyl monomer with a monomer copolymerizable with the aromatic vinyl monomer, followed by polymerization of the mixture. Here, the polymerization may be performed by any suitable polymerization method known in the art, such as emulsion polymerization, suspension polymerization, and bulk polymerization.

In some embodiments, the aromatic vinyl monomer may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof. The aromatic vinyl monomer may be present in an amount of about 20 wt % to about 90 wt %, for example, about 30 wt % to about 80 wt %, based on the total weight of the aromatic vinyl copolymer resin. Within this range, the thermoplastic resin composition can have good properties in terms of impact resistance and flowability.

In some embodiments, the monomer copolymerizable with the aromatic vinyl monomer may include, for example, vinyl cyanide monomers such as acrylonitrile, methacrylonitrile, ethacrylonitrile, phenylacrylonitrile, α-chloroacrylonitrile, and fumaronitrile. These may be used alone or as a mixture thereof. The monomer copolymerizable with the aromatic vinyl monomer may be present in an amount of about 10 wt % to about 80 wt %, for example, about 20 wt % to about 70 wt %, based on the total weight of the aromatic vinyl copolymer resin. Within this range, the thermoplastic resin composition can have good properties in terms of impact resistance and flowability.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin composition can have good properties in terms of mechanical strength and moldability.

In some embodiments, the aromatic vinyl copolymer resin may be present in an amount of about 40 wt % to about 85 wt %, for example, about 45 wt % to about 80 wt %, based on the total weight of the base resin ((A1), (A2), and (A3)). Within this range, the thermoplastic resin composition can have good low-gloss properties, appearance characteristics, impact resistance, and flowability (moldability).

The base resin according to one embodiment of the present invention may have a structure in which the rubber-modified vinyl graft copolymer (A1) and the large-diameter rubber polymer (A2) are present as a dispersed phase in the aromatic vinyl copolymer resin (A3) as a continuous phase. For example, the base resin may be prepared by preparing a rubber-modified aromatic vinyl copolymer resin in which the large-diameter rubber polymer (A2, dispersed phase) is dispersed in the aromatic vinyl copolymer resin (A3, continuous phase), followed by addition of the rubber-modified vinyl graft copolymer (A1) thereto, wherein the separate aromatic vinyl copolymer resin (A3) may be added to the base resin to allow the content of the corresponding component of the base resin to fall within the range specified herein.

(B) Zinc Oxide

The zinc oxide according to the present invention serves to improve antibacterial properties and weather resistance of the thermoplastic resin composition, and may have an average particle diameter of about 0.5 µm to about 3 µm, for example, about 1 µm to about 3 µm, as measured using a particle size analyzer, a BET specific surface area of about 1 m$^2$/g to about 10 m$^2$/g, for example, about 1 m$^2$/g to about 7 m$^2$/g, and a purity of about 99% or more. If the above parameters are outside these ranges, the thermoplastic resin composition can have poor antibacterial properties and weather resistance.

In some embodiments, the zinc oxide may have a peak intensity ratio (B/A) of about 0.01 to about 1, for example, about 0.1 to about 1, where A indicates a peak in the wavelength range of 370 nm to 390 nm and B indicates a peak in the wavelength range of 450 nm to 600 nm in photoluminescence measurement. Within this range, the thermoplastic resin composition can have further improved weather resistance and antibacterial properties.

In some embodiments, the zinc oxide may have a peak position degree (2θ) in the range of 35° to 37° and a crystallite size of about 1,000 Å to about 2,000 Å, for example, about 1,200 Å to about 1,800 Å, in X-ray diffraction (XRD) analysis, as calculated by Scherrer's equation (Equation 1) with reference to a measured FWHM value (full width at half maximum of a diffraction peak). Within this range, the thermoplastic resin composition can have good initial color, weather resistance, and antibacterial properties.

$$\text{Crystallite size } (D) = \frac{K\lambda}{\beta\cos\theta} \quad \text{[Equation 1]}$$

where K is a shape factor, λ is an X-ray wavelength, β is an FWHM value (degree) of an X-ray diffraction peak, and θ is a peak position degree.

In some embodiments, the zinc oxide may be prepared by melting metallic zinc in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., heating the reactor to about 700° C. to about 800° C. for about 30 minutes to about 150 minutes while injecting nitrogen/hydrogen gas into the reactor, as needed, and cooling the reactor to room temperature (about 20° C. to about 30° C.).

In some embodiments, the zinc oxide may be present in an amount of about 0.1 parts by weight to about 10 parts by weight, for example, about 0.5 parts by weight to about 6 parts by weight, specifically about 1 part by weight to about 4 parts by weight, relative to about 100 parts by weight of the base resin. Within this range, the thermoplastic resin composition can have good antibacterial properties, weather resistance, and low-gloss properties.

The thermoplastic resin composition according to the present invention may further include additives used in typical thermoplastic resin compositions. Examples of the additives may include matting agents, weather stabilizers, flame retardants, fillers, antioxidants, anti-dripping agents, lubricants, release agents, nucleating agents, antistatic agents, pigments, dyes, and combinations thereof, without being limited thereto. The additive may be present in an amount of about 0.001 parts by weight to about 40 parts by weight, for example, about 0.1 parts by weight to about 10 parts by weight, relative to about 100 parts by weight of the base resin.

The thermoplastic resin composition according to one embodiment of the present invention may be prepared in pellet form by mixing the aforementioned components, followed by melt extrusion in a typical twin-screw extruder at about 200° C. to about 280° C., for example, about 220° C. to about 250° C.

In some embodiments, the thermoplastic resin composition may have a structure in which the rubber-modified vinyl graft copolymer (A1), the large-diameter rubber polymer (A2), and the zinc oxide (B) are present as a dispersed phase in the aromatic vinyl copolymer resin (A3) as a continuous phase.

In some embodiments, the thermoplastic resin composition may have a gloss of about 10% to about 70%, for example, about 20% to about 70%, as measured at an angle of 60° in accordance with ASTM D523.

In some embodiments, the thermoplastic resin composition may have an antibacterial activity of about 2.0 to about 7.0, for example, about 3 to about 7, against *Staphylococcus aureus* and an antibacterial activity of about 2.0 to about 7.5, for example, about 3 to about 7.5, against *Escherichia coli*, as measured on 5 cm×5 cm specimens after inoculation with *Staphylococcus aureus* and *Escherichia coli*, respectively, and culturing under conditions of 35° C. and 90% RH for 24 hours in accordance with JIS Z 2801.

A molded product according to the present invention may be formed of the thermoplastic resin composition set forth above. The thermoplastic resin composition may be prepared in pellet form. The prepared pellets may be produced into various molded products (articles) by various molding methods such as injection molding, extrusion, vacuum molding, and casting. Such molding methods are well known to those skilled in the art. The molded product has good low-gloss properties, antibacterial properties, weather resistance, impact resistance, and flowability (moldability), and thus is useful as interior/exterior materials for electrical/electronic products, interior/exterior materials for automobiles, and exterior materials for construction, which require low-gloss properties.

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:

(A) Base Resin (A1) Rubber-Modified Aromatic Vinyl Graft Copolymer

A g-ABS copolymer obtained by graft-copolymerization of 55 wt % of styrene and acrylonitrile (weight ratio: 75/25) to 45 wt % of polybutadiene rubber (PBR, Z-average particle size: 310 nm) was used.

(A2) Large-Diameter Rubber Polymer (A2-1) 8.8 parts by weight of a butadiene rubber (BR-1, ASADENE 55AE) having a viscosity of 170 cP in a 5 wt % styrene solution was dissolved in a mixed solution of 53.4 parts by weight of a styrene monomer, 17.8 parts by weight of an acrylonitrile monomer, and 20 parts by weight of ethylbenzene as a reaction solvent, followed by addition of 0.015 parts by weight of 1,1-bis (t-butylperoxy)cyclohexane as a polymerization initiator and 0.07 parts by weight of t-dodecyl mercaptan as a molecular weight regulator, thereby preparing a mixed solution. The prepared mixed solution was introduced into reactors at a rate of 25 kg/hr. The prepared mixed solution was subjected to stirring at a rate of 130 rpm and polymerization to a conversion of 35% in a first reactor, and then was subjected to stirring at a rate of 70 rpm and polymerization to a conversion of 70% in a second reactor, followed by removal of a remaining unreacted material through a devolatilization tank, thereby preparing a rubber-modified aromatic vinyl copolymer resin (ABS resin, a mixture of a large-diameter rubber polymer (A2-1, dispersed phase) and an aromatic vinyl copolymer resin (SAN resin, A3-1, continuous phase), dispersed phase: continuous phase: 12 wt %:88 wt %) in pellet form. Here, the large-diameter rubber polymer (A2-1) had an average particle diameter of 5,160 nm, and the SAN resin (A3-1) had a weight average molecular weight of 130,000 g/mol.

(A2-2) A rubber-modified aromatic vinyl copolymer resin (ABS resin, a mixture of a large-diameter rubber polymer (A2-2, dispersed phase) and an aromatic vinyl copolymer resin (SAN resin, A3-2, continuous phase), dispersed phase: continuous phase: 12 wt %:88 wt %) was prepared in the same manner as in preparation of (A2-1), except that the stirring rate in the first reactor was changed to 100 rpm. Here, the large-diameter rubber polymer (A2-2) had an average particle diameter of 8,580 nm, and the SAN resin (A3-2) had a weight average molecular weight of 130,000 g/mol.

(A2-3) A rubber-modified aromatic vinyl copolymer resin (ABS resin, a mixture of a large-diameter rubber polymer (A2-3, dispersed phase) and an aromatic vinyl copolymer resin (SAN resin, A3-3, continuous phase), dispersed phase: continuous phase: 12 wt %:88 wt %) was prepared in the same manner as in preparation of (A2-1), except that a butadiene rubber (BR-2: ASAPRENE 700A) having a viscosity of 45 cP in a 5 wt % styrene solution was used. Here, the large-diameter rubber polymer (A2-3) had an average particle diameter of 1,370 nm, and the SAN resin (A3-3) had a weight average molecular weight of 130,000 g/mol.

Here, the average particle diameter of the rubber-modified aromatic vinyl graft copolymer (A1) and the large-diameter rubber polymer (A2) refers to a volume average particle size measured using a particle size analyzer (Mastersizer S Ver. 2.14 manufactured by Malvern Instruments Ltd.).

(A3) Aromatic Vinyl Copolymer Resin

A SAN resin (weight average molecular weight: 130,000 g/mol) obtained by emulsion polymerization of 75 wt % of styrene with 25 wt % of acrylonitrile was used as an additional aromatic vinyl copolymer resin other than the SAN resin described above (A3-1, A3-2, or A3-3).

(B) Zinc Oxide (B1) Zinc oxide having an average particle size, a BET surface area, a purity, a crystallite size, and a peak intensity ratio (B/A) where A indicates a peak in the wavelength range of 370 nm to 390 nm and B indicates a peak in the wavelength range of 450 nm to 600 nm in photoluminescence measurement as listed in Table 1 was used.

(B2) Zinc oxide having an average particle size, a BET surface area, a purity, a crystallite size, and a peak intensity ratio (B/A) where A indicates a peak in the wavelength range of 370 nm to 390 nm and B indicates a peak in the wavelength range of 450 nm to 600 nm in photoluminescence measurement as listed in Table 1 was used.

TABLE 1

|  | (B1) | (B2) |
|---|---|---|
| Average particle diameter (μm) | 1.2 | 1.1 |
| BET surface area (m$^2$/g) | 4 | 15 |
| Purity (%) | 99 | 97 |
| PL peak intensity ratio (B/A) | 0.28 | 9.8 |
| Crystallite size (Å) | 1417 | 503 |

Property Evaluation (1) Average particle diameter (unit: μm): Average particle diameter (volume average) was measured using a particle size analyzer (Laser Diffraction Particle Size Analyzer LS 13 320, Beckman Coulter Co., Ltd.).

(2) BET surface area (unit: m$^2$/g): BET surface area was measured by a nitrogen gas adsorption method using a BET analyzer (Surface Area and Porosity Analyzer ASAP 2020, Micromeritics Co., Ltd.).

(3) Purity (unit: %): Purity was measured by thermogravimetric analysis (TGA) based on the weight of remaining material at 800° C.

(4) PL peak intensity ratio (B/A): Spectrum emitted upon irradiation of a specimen using a He—Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak B in the wavelength range of 450 nm to 600 nm to peak A in the wavelength range of 370 nm to 390 nm was measured. Here, an injection molded specimen was irradiated with laser beams without separate treatment upon PL analysis, and zinc oxide powder was compressed in a pelletizer having a diameter of 6 mm to prepare a flat specimen.

(5) Crystallite size (unit: Å): Crystallite size was measured using a high-resolution X-ray diffractometer (PRO-MRD, X'pert Inc.) at a peak position degree (2θ) in the range of 35° to 37° and calculated by Scherrer's equation (Equation 1) with reference to a measured FWHM value (full width at half maximum of a diffraction peak). Here, both a powder form and an injection molded specimen could be measured. For more accurate analysis, the injection molded specimen was subjected to heat treatment in air at 600° C. for 2 hours to remove a polymer resin therefrom before XRD analysis.

$$\text{Crystallite size } (D) = \frac{K\lambda}{\beta \cos\theta} \qquad [\text{Equation 1}]$$

where K is a shape factor, λ is an X-ray wavelength, β is an FWHM value (degree) of an X-ray diffraction peak, and θ is a peak position degree.

Examples 1 to 3 and Comparative Examples 1 to 3

The aforementioned components were mixed in amounts as listed in Table 2, followed by extrusion at 230° C., thereby preparing a thermoplastic resin composition in pellet form. Here, the base resin (A) was prepared by preparing a rubber-modified aromatic vinyl copolymer resin in which the large-diameter rubber polymer (A2-1, A2-2, or A2-3, dispersed phase) was dispersed in the aromatic vinyl copolymer resin (A3-1, A3-2, or A3-3, continuous phase), followed by addition of the rubber-modified vinyl graft copolymer (A1). In addition, the separate aromatic vinyl copolymer resin was added to the base resin to allow the amount of the corresponding component of the base resin (A) to fall within the range set forth herein.

In addition, extrusion was performed using a twin-screw extruder (L/D: 36, Φ: 45 mm). The prepared pellets were dried at 80° C. for 2 hours or more and then subjected to injection molding using a 6 oz. injection machine (molding temperature: 230° C., mold temperature: 60° C.), thereby preparing a specimen. The prepared specimen was evaluated as to the following properties. Results are shown in Table 2.

Property Evaluation (1) Gloss (surface gloss, unit: %): Gloss was measured at an angle of 60° using a gloss meter (BYK-Gardner, BYK Chemie) in accordance with ASTM D523.

(2) Antibacterial activity: Antibacterial activity was measured on 5 cm×5 cm specimens after inoculation with *Staphylococcus aureus* and *Escherichia coli*, respectively, and culturing under conditions of 35° C. and 90% RH for 24 hours in accordance with JIS Z 2801.

(3) Notched Izod impact strength (unit: kgf·cm/cm): Notched Izod impact strength was measured on a ¼" thick notched Izod specimen in accordance with ASTM D256.

(4) Melt index (MI, unit: g/10 min): Melt index was measured at a temperature of 220° C. under a load of 10 kgf in accordance with ASTMD1238.

TABLE 2

| | | Example | | | Comparative Example | | |
|---|---|---|---|---|---|---|---|
| | | 1 | 2 | 3 | 1 | 2 | 3 |
| (A) (wt %) | (A1) | 50 | 55 | 60 | 50 | 50 | 50 |
| | (A2-1) | 2.4 | 2.4 | 2.4 | — | — | — |
| | (A2-2) | — | — | — | 2.4 | — | 2.4 |
| | (A2-3) | — | — | — | — | 2.4 | — |
| | (A3) | 47.6 | 42.6 | 37.6 | 47.6 | 47.6 | 47.6 |

TABLE 2-continued

| | | Example | | | Comparative Example | | |
|---|---|---|---|---|---|---|---|
| | | 1 | 2 | 3 | 1 | 2 | 3 |
| (B) (parts by weight) | (B1) | 2 | 2 | 2 | 2 | 2 | — |
| | (B2) | — | — | — | — | — | 2 |
| Gloss (%) | | 65 | 62 | 58 | 85 | 80 | 80 |
| Antibacterial activity (*Escherichia coli*) | | 3.2 | 4.0 | 3.5 | 3.9 | 4.6 | 5.7 |
| Antibacterial activity (*Staphylococcus aureus*) | | 4.5 | 5.8 | 5.1 | 6.3 | 5.9 | 6.8 |
| Notched Izod impact strength | | 8 | 8 | 8 | 8 | 7 | 6 |
| Melt index | | 25 | 22 | 19 | 24 | 20 | 23 |

* Parts by weight relative to 100 parts by weight of the base resin (A)

From the results shown in Table 2, it can be seen that the thermoplastic resin composition according to the present invention exhibited good low-gloss properties, antibacterial properties, impact resistance, and flowability (processability).

On the contrary, the thermoplastic resin composition of Comparative Example 1, including the large-diameter rubber polymer (A2-2) having an average particle size less than the range according to the present invention, had poor low-gloss properties, and the thermoplastic resin composition of Comparative Example 2, including the large-diameter rubber polymer (A2-3) having an average particle size exceeding the range according to the present invention, had poor low-gloss properties and impact resistance. In addition, the thermoplastic resin composition of Comparative Example 3, including the large-diameter rubber polymer (A2-2) having an average particle size less than the range according to the present invention and the zinc oxide (B2, specific surface area: exceeding 10 m²/g) having a specific surface area exceeding the range according to the present invention instead of the zinc oxide (B1) according to the present invention, had poor low-gloss properties and antibacterial properties.

It should be understood that various modifications, changes, alterations, and equivalent embodiments can be made by those skilled in the art without departing from the spirit and scope of the invention.

The invention claimed is:

1. A thermoplastic resin composition comprising:
a base resin comprising a rubber-modified vinyl graft copolymer, a large-diameter rubber polymer having an average particle diameter of about 3,000 nm to about 8,000 nm, and an aromatic vinyl copolymer resin; and
zinc oxide having an average particle diameter of about 0.5 μm to about 3 μm, a BET specific surface area of about 1 m²/g to about 10 m²/g, a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement, a peak position degree (2θ) in the range of 35° to 37°, and a crystallite size of about 1,000 Å to about 2,000 Å in X-ray diffraction (XRD) analysis, as calculated by Equation 1:

$$\text{Crystallite size } (D) = \frac{K\lambda}{\beta \cos\theta} \qquad [\text{Equation 1}]$$

where K is a shape factor, λ is an X-ray wavelength, β is an FWHM value (degree) of an X-ray diffraction peak, and θ is a peak position degree, wherein the base resin comprises about 0.5 wt % to about 8 wt % of the large-diameter rubber polymer, based on 100 wt% of the rubber-modified vinyl graft copolymer, the large-diameter rubber polymer, and the aromatic vinyl copolymer resin.

2. The thermoplastic resin composition according to claim 1, wherein the rubber-modified vinyl graft copolymer is obtained by graft-polymerization of a monomer mixture comprising an aromatic vinyl monomer and a vinyl cyanide monomer to a rubber polymer having an average particle diameter of about 100 nm to about 600 nm.

3. The thermoplastic resin composition according to claim 1, wherein the large-diameter rubber polymer is present in the thermoplastic resin composition in the form of a rubber-modified aromatic vinyl copolymer resin prepared by continuous solution polymerization of a rubber polymer having a viscosity of about 150 cP or more in a 5 wt % styrene solution, an aromatic vinyl monomer, and a monomer copolymerizable with the aromatic vinyl monomer.

4. The thermoplastic resin composition according to claim 1, wherein the aromatic vinyl copolymer resin is a polymer of an aromatic vinyl monomer and a monomer copolymerizable with the aromatic vinyl monomer.

5. The thermoplastic resin composition according to claim 1, wherein the thermoplastic resin composition has a structure in which the rubber-modified vinyl graft copolymer, the large-diameter rubber polymer, and the zinc oxide are present as a dispersed phase in the aromatic vinyl copolymer resin as a continuous phase.

6. The thermoplastic resin composition according to claim 1, wherein the thermoplastic resin composition has a gloss of about 10% to about 70%, as measured at an angle of 60° in accordance with ASTM D523.

7. The thermoplastic resin composition according to claim 1, wherein the thermoplastic resin composition has an antibacterial activity of about 2.0 to about 7.0 against *Staphylococcus aureus* and an antibacterial activity of about 2.0 to about 7.5 against *Escherichia coli*, as measured on 5 cm×5 cm specimens after inoculation with *Staphylococcus aureus* and *Escherichia coli*, respectively, and culturing under conditions of 35° C. and 90% RH for 24 hours in accordance with JIS Z 2801.

8. A molded product formed of the thermoplastic resin composition according to claim 1.

9. The thermoplastic resin composition according to claim 1, wherein the zinc oxide has an average particle diameter of about 1 μm to about 3 μm.

10. The thermoplastic resin composition according to claim 1, wherein the base resin comprises about 0.5 wt % to about 5 wt % of the large-diameter rubber polymer, based on 100 wt % of the rubber-modified vinyl graft copolymer, the large-diameter rubber polymer, and the aromatic vinyl copolymer resin.

* * * * *